(12) United States Patent
Baucco et al.

(10) Patent No.: US 11,208,896 B1
(45) Date of Patent: Dec. 28, 2021

(54) TURBINE SHROUD HAVING CERAMIC MATRIX COMPOSITE COMPONENT MOUNTED WITH COOLED PIN

(71) Applicant: Rolls-Royce Corporation, Indianapolis, IN (US)

(72) Inventors: Alexandra Baucco, Seattle, WA (US); Aaron D. Sippel, Zionsville, IN (US); Ted J. Freeman, Danvile, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/075,264

(22) Filed: Oct. 20, 2020

(51) Int. Cl.
- F01D 5/14 (2006.01)
- F01D 5/30 (2006.01)
- F01D 9/06 (2006.01)
- F01D 9/04 (2006.01)

(52) U.S. Cl.
CPC ........... F01D 5/143 (2013.01); F01D 5/3084 (2013.01); F01D 9/042 (2013.01); F01D 9/065 (2013.01)

(58) Field of Classification Search
CPC ........ F01D 5/143; F01D 5/3038; F01D 9/042; F01D 9/065
See application file for complete search history.

(56) References Cited

U.S. PATENT DOCUMENTS

| | | | |
|---|---|---|---|
| 5,368,444 A | 11/1994 | Anderson | |
| 6,821,085 B2 * | 11/2004 | Darkins, Jr. | ............ F01D 11/08 415/116 |
| 6,877,952 B2 | 4/2005 | Wilson | |
| 6,884,026 B2 | 4/2005 | Glynn et al. | |
| 7,044,709 B2 * | 5/2006 | Bruce | ........................ F01D 9/04 415/135 |
| 7,416,362 B2 * | 8/2008 | North | .................... F16B 5/0241 267/150 |
| 7,494,317 B2 * | 2/2009 | Keller | ................... F01D 11/025 415/136 |
| 7,556,475 B2 * | 7/2009 | Roberts, III | ............ F01D 11/08 29/889.2 |
| 7,563,071 B2 | 7/2009 | Campbell et al. | |
| 7,726,936 B2 * | 6/2010 | Keller | ..................... F01D 11/12 415/173.4 |
| 7,874,059 B2 | 1/2011 | Morrison et al. | |
| 9,863,265 B2 | 1/2018 | Stapleton et al. | |
| 9,963,990 B2 * | 5/2018 | Vetters | ..................... F01D 9/04 |
| 10,012,100 B2 * | 7/2018 | Vetters | ................... F01D 21/003 |
| 10,138,750 B2 | 11/2018 | McCaffrey et al. | |
| 10,301,960 B2 | 5/2019 | Stapleton et al. | |
| 10,378,386 B2 | 8/2019 | Roussille et al. | |
| 2007/0031258 A1 * | 2/2007 | Campbell | ................. F01D 9/04 416/189 |
| 2008/0193289 A1 * | 8/2008 | Khanin | ................... F01D 9/042 415/209.2 |
| 2017/0016341 A1 | 1/2017 | Stapleton et al. | |
| 2018/0051591 A1 | 2/2018 | Quennehen et al. | |
| 2018/0073398 A1 | 3/2018 | Quennehen et al. | |
| 2018/0087401 A1 | 3/2018 | Quennehen et al. | |
| 2019/0107002 A1 | 4/2019 | Crutchfield | |

* cited by examiner

*Primary Examiner* — Igor Kershteyn

(74) *Attorney, Agent, or Firm* — Barnes & Thornburg LLP

(57) ABSTRACT

An assembly adapted for use in a gas turbine engine includes a carrier and a blade track segment. The carrier extends at least partway about an axis. The blade track segment is supported by the carrier radially relative to the axis to define a portion of a gas path of the assembly.

20 Claims, 6 Drawing Sheets

(OPTION 2)

TURBINE SHROUD HAVING CERAMIC MATRIX COMPOSITE COMPONENT MOUNTED WITH COOLED PIN

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

A turbine shroud assembly adapted for use in a gas turbine engine may comprise a carrier, a blade track segment, and an intermediate carrier. The carrier may comprise metallic materials and may be arranged to extend circumferentially at least partway about an axis. The blade track segment may comprise ceramic matrix composite materials. The intermediate carrier may be configured to couple the blade track segment to the carrier.

In some embodiments, the carrier may be formed to include a feed passageway. The feed passageway may be configured to conduct cooling air through a portion of the carrier.

In some embodiments, the blade track segment may be formed to include a runner, a first mount post, and a second mount post. The runner may be shaped to extend circumferentially partway around the axis. The first mount post may extend radially outward from the runner. The second mount post may extend radially outward from the runner. The second mount post may be spaced apart axially from the first mount post to define a channel therebetween.

In some embodiments, the intermediate carrier may include an intermediate carrier body, at least one pin, and at least one retainer. The intermediate carrier body may be arranged axially between the first mount post and the second mount post. The pin may extend axially into the first mount post, the intermediate carrier body, and the second mount post to couple the intermediate carrier body to the blade track segment. The retainer may extend radially outward from the intermediate carrier body through the carrier to couple the intermediate carrier and the blade track segment with the carrier.

In some embodiments, the pin may be formed to include a cooling passageway. The cooling passageway may extend axially through the at least one pin and align with the feed passageway of the carrier. The cooling passageway may align with the feed passageway such that cooling air is configured to be conducted from the feed passageway through the pin to cool the pin.

In some embodiments, the carrier may include an outer wall, the first radial wall, and a second radial wall. The carrier may extend circumferentially at least partway about the axis. The first radial wall may extend radially inward from the outer wall. The second radial wall may extend radially inward from the outer wall. The second radial wall may be spaced apart from the first radial wall to define an attachment-receiving space therebetween. In some embodiments, the feed passageway may extend axially through the first radial wall of the carrier.

In some embodiments, the first radial wall may be formed to include a feed cavity. The feed cavity may be configured to receive cooling air from a cooling air source. The feed passageway may be in fluid communication with the feed cavity.

In some embodiment, the pin may include a first end, a second end, and a body. The first end may be located adjacent to the first radial wall. The second end may be spaced apart axially from the first end of the pin and located adjacent to the second radial wall. The body may extend between and interconnect the first end and the second end.

In some embodiments, the second end may be shaped to include a recess. The recess may extend axially into the second end of the pin so that an outlet of cooling passageway is spaced apart axially from the second radial wall.

In some embodiments, the pin may include a first end, a second end, and a body. The first end may be located adjacent an outlet of the feed passageway in the carrier. The second end may be spaced apart axially from the first end of the pin. The body may extend between and interconnect the first end and the second end.

In some embodiments, the second end may be shaped to include a recess. The recess may extend axially into the second end of the pin.

In some embodiments, the feed passageway may have a first diameter and the cooling passageway may have a second diameter. The second diameter may be greater than the first diameter of the feed passageway. In some embodiments, the second diameter of the cooling passageway varies along an axial length of the pin.

In some embodiments, the second diameter of the cooling passageway may have a maximum value at the first end of the pin and at the second end of the pin. The second diameter of the cooling passageway may have a minimum value proximate an axial center of the pin.

In some embodiments, the first end of the pin may form a pin head and a body. The pin head may be located adjacent an outlet of the feed passageway. The body may extend axially from the pin.

In some embodiments, the body may have a first diameter. The first diameter may be less than a second diameter of the pin head.

In some embodiments, the feed passageway may have a first diameter and the cooling passageway has a second diameter. The second diameter may be greater than the first diameter of the feed passageway. In some embodiments, the second diameter of the cooling passageway varies along an axial length of the at least one pin.

According to another aspect of the present disclosure, a turbine shroud assembly adapted for use in a gas turbine engine may comprise a carrier, a blade track segment, and an intermediate carrier. The carrier may extend at least partway circumferentially around an axis. The blade track segment may include a runner shaped to extend partway around the axis and an attachment portion that extends radially outward from the runner. The intermediate carrier may be configured to couple the blade track segment to the carrier.

In some embodiments, the carrier may be formed to include a feed passageway. The feed passageway may be configured to conduct cooling air through a portion of the carrier.

In some embodiments, the intermediate carrier may include an intermediate carrier body, a pin, and a first retainer. The pin may extend axially into the attachment portion and the intermediate carrier body to couple the intermediate carrier body to the blade track segment. The first retainer may extend through the carrier to couple the intermediate carrier and the blade track segment to the carrier.

In some embodiments, the pin may be formed to include a cooling passageway. The cooling passageway may extend axially through the pin and align with the feed passageway of the carrier. The cooling passageway may align with the feed passageway such that cooling air is configured to be conducted from the feed passageway through the pin to cool the pin.

In some embodiments, the carrier may include an outer wall, a first radial wall, and a second radial wall. The outer wall may extend circumferentially at least partway about the axis. The first radial wall may extend radially inward from the outer wall. The second radial wall may extend radially inward from the outer wall.

In some embodiments, the second radial wall may be spaced apart from the first radial wall to define an attachment-receiving space therebetween. The feed passageway may extend axially through the first radial wall of the carrier.

In some embodiments, the pin may include a first end, a second end, and a body. The first end may be located adjacent to the first radial wall. The second end may be spaced apart axially from the first end of the pin and may be located adjacent to the second radial wall. The body may extend between and interconnect the first end and the second end.

In some embodiments, the second end may be shaped to include a recess. The recess may extend axially into the second end of the pin so that an outlet of cooling passageway is spaced apart axially from the second radial wall.

In some embodiments, the pin may include a first end, a second end, and a body. The first end may be located adjacent an outlet of the feed passageway in the carrier. The second end may be spaced apart axially from the first end of the pin. The body may extend between and interconnect the first end and the second end.

In some embodiments, the second end shaped to include a recess. The recess may extend axially into the second end of the pin.

In some embodiments, the feed passageway may have a first diameter and the cooling passageway may have a second diameter. The second diameter may be greater than the first diameter of the feed passageway. In some embodiments, the second diameter of the cooling passageway varies along an axial length of the pin.

In some embodiments, the pin may include a pin head and a body. The pin head may be located adjacent an outlet of the feed passageway. The body may extend axially from the pin.

In some embodiments, the body may have a first diameter. The first diameter may be less than a second diameter of the pin head.

According to another aspect of the present disclosure, a method may comprise providing a carrier, a blade track segment, and an intermediate carrier. The intermediate carrier may be configured to couple the blade track segment to the carrier.

In some embodiments, the blade track segment may include a runner, a first mount post, and a second mount post. The runner may be shaped to extend partway around an axis. The first mount post may extend radially outward from the runner. The second mount post may be spaced apart axially from the first mount post. The second mount post may extend radially outward from the runner.

In some embodiments, the intermediate carrier may include an intermediate carrier body, a pin, and a retainer. The pin may be formed to include a cooling passageway. The cooling passageway may extends axially through the pin.

In some embodiments, the method may further comprise arranging the intermediate carrier axially between the first mount post and the second mount post. The intermediate carrier may be arranged between the first and second most posts so that a pin hole formed in the intermediate carrier aligns circumferentially with a pin hole in the first mount post and a pin hole in the second mount post.

In some embodiments, the method may further comprise inserting the pin through the pin hole formed in the first mount post, the pin hole formed in the intermediate carrier, and the pin hole formed in the second mount post to couple the blade track segment to the intermediate carrier body. In some embodiments, the method may further comprise arranging the intermediate carrier in an attachment space formed in the carrier so that a feed passageway formed in the carrier aligns with the cooling passageway formed in the pin.

In some embodiments, the method may further comprise coupling the retainer of the intermediate carrier with the carrier. In some embodiments, the method may further include directing a flow of cooling air from the feed passageway in the carrier, through the cooling passageway in the pin, and into the attachment space formed in the carrier to cool the pin.

In some embodiments, the feed passageway may have a first diameter and the cooling passageway may have a second diameter. The second diameter may be greater than the first diameter of the feed passageway.

These and other features of the present disclosure will become more apparent from the following description of the illustrative embodiments.

DETAILED DESCRIPTION OF THE DRAWINGS

Figure 1:
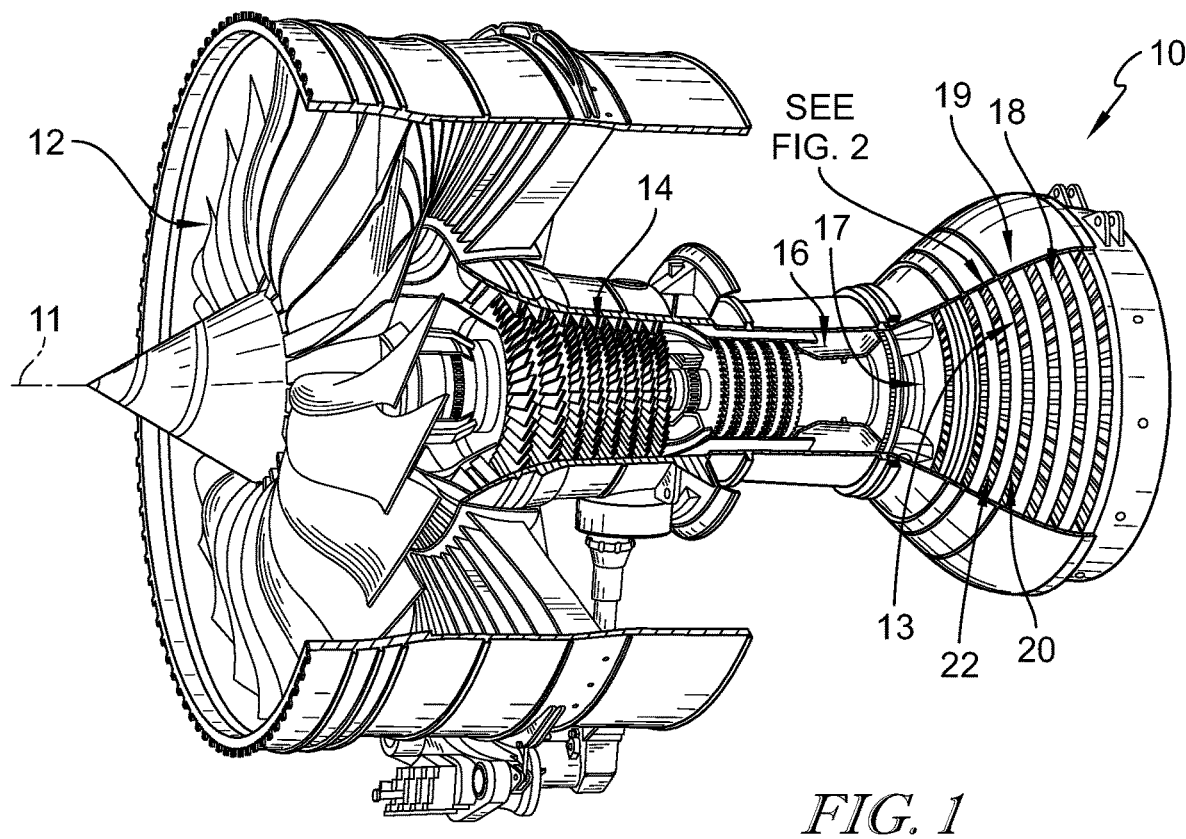
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

Figure 2:
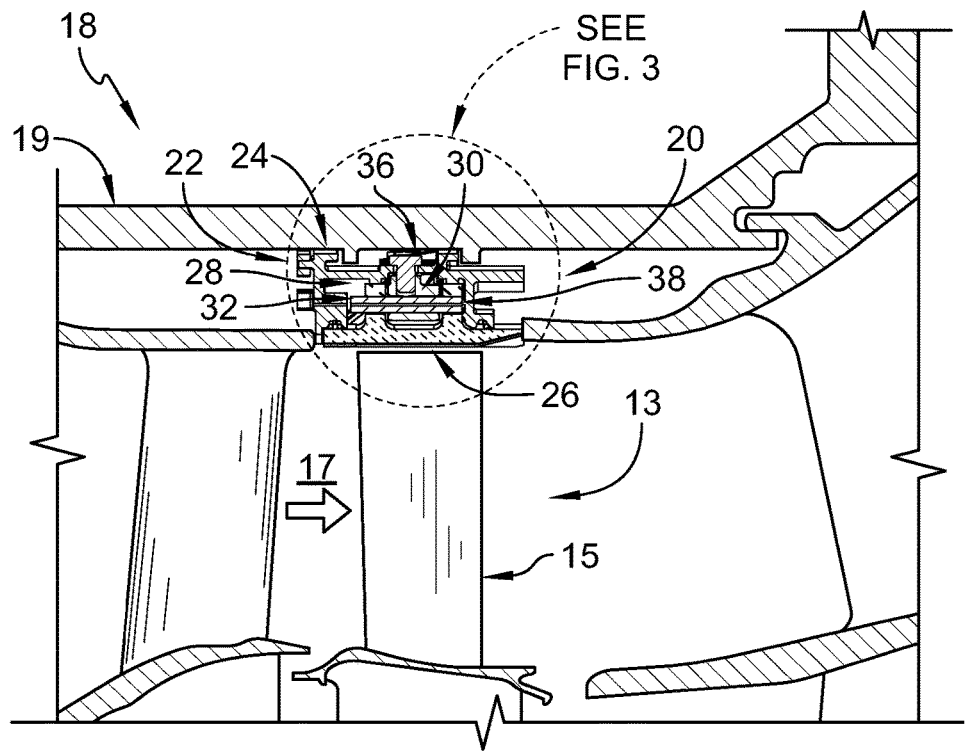
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades, and further showing the turbine shroud assembly includes a carrier, a blade track segment made from ceramic matrix composite materials, and an intermediate carrier for coupling the blade track segment to the carrier.
Figure 3:
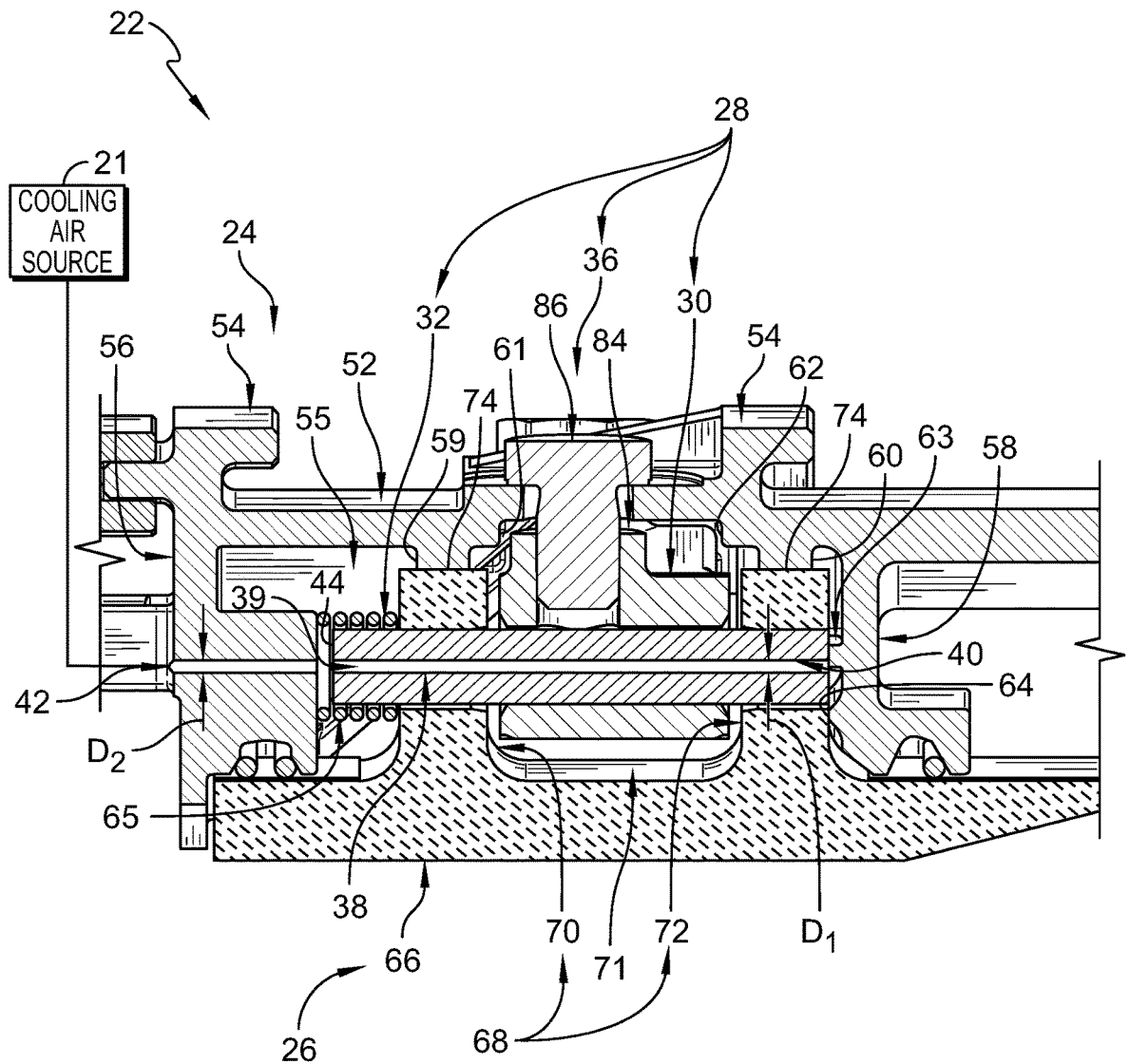
FIG. 3 is detail cross-section view of the turbine shroud assembly of FIG. 2 showing the intermediate carrier includes an intermediate carrier body, a pin that extends axially through the blade track segment and the intermediate carrier body, and retainers that extend radially through the carrier to couple the intermediate carrier to the carrier, and showing the pin is formed to include a cooling passageway that extends axially through the pin and aligns with a feed passageway formed in the carrier to conduct cooling air through the pin to cool the intermediate carrier.
Figure 4:
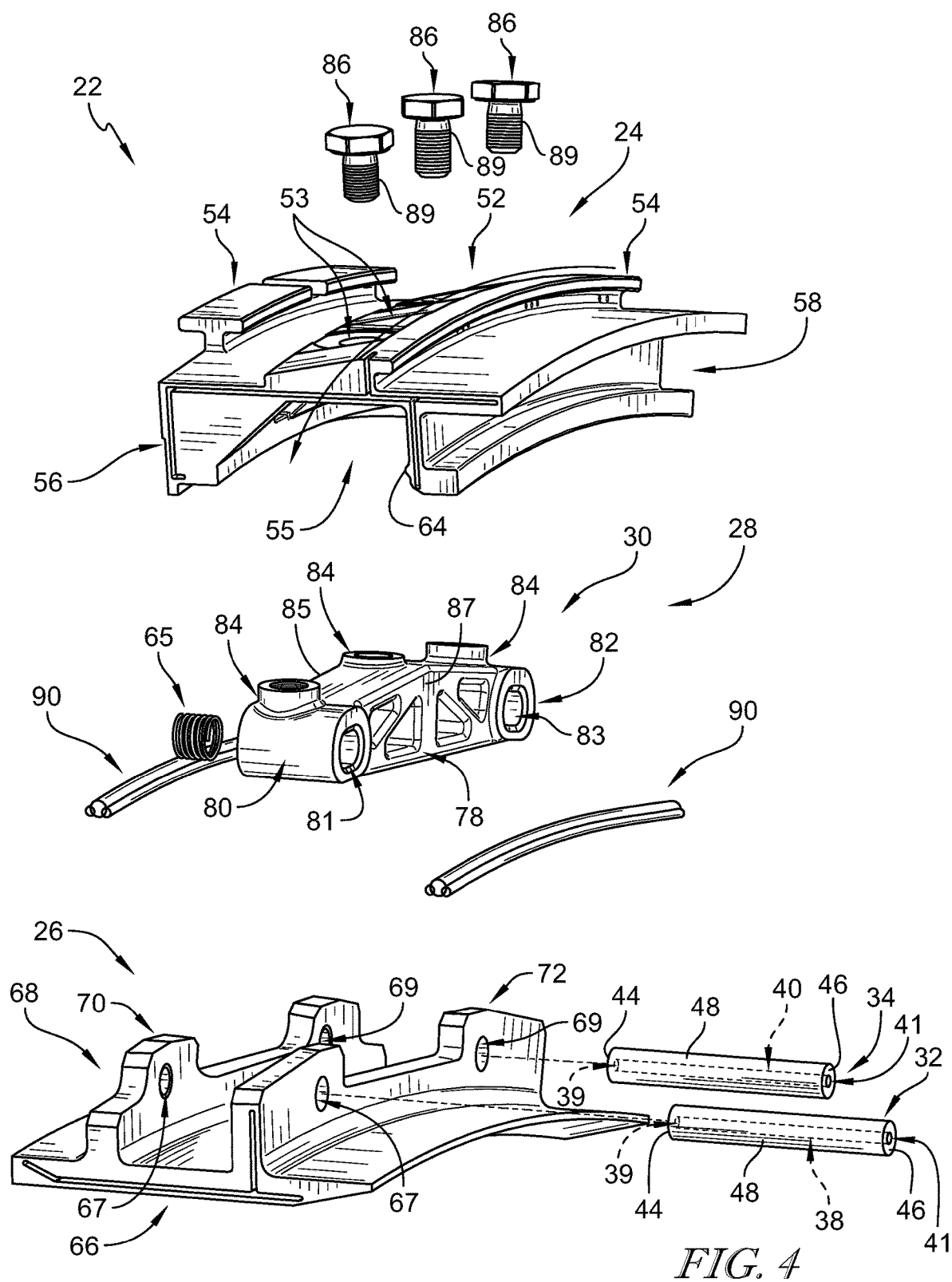
FIG. 4 is an exploded view of the turbine shroud assembly of FIG. 3 showing, from top to bottom, the carrier, the intermediate carrier, and the blade track segment.

A turbine shroud segment 22 adapted for use in a gas turbine engine 10 is shown in FIGS. 2-4. The turbine shroud segment 22 includes a carrier 24, a blade track segment 26, and an intermediate carrier 28 configured to couple the blade track segment 26 to the carrier 24 as shown in FIGS. 2-4. The carrier 24 is a metallic support component configured to interface with other metallic components of the gas turbine engine 10. The blade track segment 26 is a ceramic matrix composite component configured to directly face the high temperatures of a gas path 17 of the gas turbine engine 10. The intermediate carrier 28 is designed to engage the blade track segment 26 so as to couple the blade track segment 26 to the carrier 24 and distribute mounting of the blade track segment 26 to the carrier 24.

The intermediate carrier 28 includes an intermediate carrier body 30, at least one pin, illustratively two pins 32, 34, and a plurality of retainers 36 as shown in FIGS. 2-4. The intermediate carrier body 30 is arranged adjacent to an attachment portion 68 of the blade track segment 26. The pins 32, 34 extend axially through the attachment portion 68 of the blade track segment 26 and the intermediate carrier body 30 to couple the blade track segment 26 to the intermediate carrier body 30. Each of the retainers 36 extends outward from the intermediate carrier body 30 to the carrier 24 and engages the carrier 24 to couple the intermediate carrier 28 to the carrier 24.

The intermediate carrier 28 provides an attachment for coupling the blade track segment 26 to the carrier 24 that accommodates the surface tolerance of the ceramic matrix composite materials, while minimizing stress in the blade track segment 26 and minimizing leakage paths in the overall assembly 20. The intermediate carrier 28 eliminates additional attachment mechanisms that may reduce the overall stack of the assembly 20 from the carrier 24 to the gas path 17. Further, by having axial pins 32, 34 and radial retainers 36, the number of leakage paths between the blade track segment 26 and the carrier 24 may be reduced.

However, as the intermediate carrier 28 is made from metallic materials, arranging the intermediate carrier body 30 adjacent to the attachment portion 68 of the blade track segment 26 may cause the components of the intermediate carrier 28 to heat up. In particular, the temperature of the components included in the intermediate carrier 28, such as the pins 32, 34, may exceed the material allowable. The location of the intermediate carrier 28 may also make it difficult to provide cooling air to cool the intermediate carrier body 30 and the pins 32, 34.

As such, each of the pins 32, 34 are formed to include a cooling passageway 38, 40 as shown in FIGS. 2-4. The cooling passageway 38, 40 extends axially through the pin 32, 34 and aligns with a corresponding feed passageway 42 formed in the carrier 24 as shown in FIG. 3. The cooling passageway 38, 40 aligns with the feed passageway 42 such that cooling air is conducted from the feed passageway 42 through the pin 32, 34. The cooling air provided by the feed passageway 42 through the cooling passageway 38, 40 of the respective pin 32, 34 helps to cool the pin 32, 34 of the intermediate carrier 28.

Each of the pins 32, 34 includes a first end 44, a second end 46, and a body 48 as shown in FIGS. 3 and 4. The first end 44 is arranged adjacent to an outlet of the feed passageway 42. The second end 46 is spaced apart axially from the first end 44. The body 48 extends between and interconnects the first end 44 and the second end 46. The cooling passageway 38, 40 extends axially through the entire axial length of the pin 32, 34.

In the illustrative embodiment, the cooling passageway 38, 40 has an inlet 39 and an outlet 41 as shown in FIGS. 3 and 4. The inlet 39 is aligned with the feed passageway 42, while the outlet 41 is spaced apart axially from the inlet 39. The cooling passageway 38, 40 has a diameter $D_1$ that is constant from the inlet 39 to the outlet 41 in the illustrative embodiment. In other embodiments, the diameter $D_1$ of the cooling passageway 38, 40 may vary along the axial length of the pin 32, 34.

In the illustrative embodiment, the feed passageway 42 has a diameter $D_2$ that is equal to the diameter $D_1$ of the cooling passageway 38, 40 as shown in FIG. 3. In other embodiments, the feed passageway 42 may have a different diameter from the cooling passageway 38, 40.

Turning again to the gas turbine engine 10, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

The turbine 18 includes at least one turbine wheel assembly 13 and a turbine shroud assembly 20 positioned to surround the turbine wheel assembly 13 as shown in FIGS. 1 and 2. The turbine shroud assembly 20 is coupled to a case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assemblies 13 along the gas path 17. The blades 15 are in turn pushed by the combustion products to cause the turbine wheel assembly 13 to rotate; thereby, driving the rotating components of the compressor 14 and/or the fan 12.

The turbine shroud assembly 20 extends around the turbine wheel assembly 13 to block combustion products from passing over the blades 15 without pushing the blades 15 to rotate as suggested in FIG. 2. In the illustrative embodiment, the turbine shroud assembly 20 is made up of a number of shroud segments 22, one of which is shown in FIGS. 3 and 4, that extend only partway around the central axis 11 and cooperate to surround the turbine wheel assembly 13. The shroud segments 22 are sealed against one another, such as by strip seal members, to provide a continuous turbine shroud assembly 20.

Each shroud segment 22 includes the carrier 24, the blade track segment 26, and the intermediate carrier 28 as shown in FIGS. 2-4. In other embodiments, the turbine shroud assembly 20 is annular and non-segmented to extend fully around the central axis 11 and surround the turbine wheel assembly 13. In yet other embodiments, certain components of the turbine shroud assembly 20 are segmented while other components are annular and non-segmented.

The carrier 24 included in each shroud segment 22 is coupled to the case 19 of the engine 10 as shown in FIG. 2. In the illustrative embodiment, the carrier 24 is segmented, while in other embodiments, the carrier 24 may be a full hoop and extend about the axis 11.

Each carrier segment 24 illustratively includes an outer wall 52, hangers 54, and fore and aft radial walls 56, 58 as shown in FIGS. 3 and 4. The outer wall 52 extends circumferentially partway about the axis 11 and is shaped to include through holes 53 that receive a portion of the retainers 36. The hangers 54 extend radially outward from the outer wall 52 and engage the case 19 to couple the turbine shroud segment 22 to the rest of the engine 10. Each of the fore and aft radial walls 56, 58 extend radially inward from the outer wall 52 on opposite axial ends of the outer wall 52. The aft radial wall 58 is spaced apart axially from the fore radial wall 56 to define the attachment-receiving space 55 therebetween that receives the attachment portion 68 of the blade track segment 26.

The fore radial wall 56 is shaped to the feed passageway 42 as shown in FIG. 4. The feed passageway 42 extends axially through the fore radial wall 56. In the illustrative embodiment, the feed passageway 42 is in fluid communication with a cooling air source 21 as shown in FIG. 3. The cooling air source 21 may be air bled off the compressor 14. In particular, the cooling air source 21 may be bleed air from the HP6 stage of the compressor 14. In other embodiments, the cooling air source 21 may be another suitable cooling air source in the engine 10.

The aft radial wall 58 is shaped to include axial pin locators 63 and a chordal seal 64 as shown in FIGS. 3 and 4. The axial pin locators 63 extend axially forward from the aft radial wall 58 to block axial movement of the corresponding pin 32, 34 relative to the blade track segment 26. The chordal seal 64 extends axially forward from the aft radial wall 58 and engages the attachment portion 68 of the blade track segment 26 to axially locate the blade track segment 26 relative to the carrier 24. In the illustrative embodiment, the chordal seal 64 is spaced radially inward from the axial pin locators 63.

In the illustrative embodiment, the axial pin locator 63 engages the second end 46 of the corresponding pin 32, 34 at a location spaced apart from the outlet 41 of the cooling passageway 38, 40. In this way, the axial pin locator 63 blocks axial movement of the pin 32, 34 without blocking the flow of cooling air out of the outlet 41.

In the illustrative embodiment, the attachment-receiving space 55 of the carrier 24 is pressurized such that the pressure biases the attachment portion 68 of the blade track segment 26 axially aft against the chordal seal 64. To aid in the axial location of the attachment portion 68 of the blade track segment 26 on the chordal seal 64, the turbine shroud segment 22 may further include a bias member 65 as shown in FIGS. 3 and 4.

The bias member 65 is arranged between the attachment portion 68 of the blade track segment 26 and the fore radial wall 56 of the carrier 24 and configured to bias the blade track segment 26 axially aft against the chordal seal 64. The bias member 65 extends around the body 48 of the corresponding pin 32, 34 near the first end 44 of the pin 32, 34 in the illustrative embodiment.

In the illustrative embodiment, the turbine shroud segment 22 further includes a plurality of seals 90 as shown in FIG. 4. The seals 90 may be tandem seals 90 that are arranged in channels formed in the fore and aft radial walls 56, 58 of the carrier 24. The seals 90 are configured to engage a runner 66 of the blade track segment 26 to seal the attachment-receiving space 55. In this way, the attachment-receiving space 55 may be pressurized.

In the illustrative embodiment, the carrier 24 is further shaped to include a plurality of locating pads 59, 60 and a plurality of orientation features 61, 62 as shown in FIG. 3. The plurality of locating pads 59, 60 each extend radially inward from the outer wall 52 into contact with a radially-outwardly facing surface 74 of the attachment portion 68 of the blade track segment 26 to radially locate the blade track segment 26 relative to the carrier 24. The orientation features 61, 62 extend radially inward from the outer wall 52 and engage the intermediate carrier 28 to orientate the intermediate carrier 28 relative to the carrier 24.

The blade track segment 26 of each shroud segment 22 comprises ceramic matrix composite materials as suggested in FIGS. 2 and 3. The blade track segment 26 is held in place adjacent to tips of blades 15 to block combustion products from passing over the blades 15 without pushing the blades 15 to rotate.

The blade track segment 26 is illustratively formed to include the runner 66 and the attachment portion 68 as shown in FIGS. 3 and 4. The runner 66 is arcuate and extends partway around axis 11 adjacent to blades 15. The attachment portion 68 extends radially outward from the runner 66 to provide structure for coupling the blade track segment 26 to the carrier 24.

In the illustrative embodiment, the attachment portion 68 includes a first mount post 70 and a second mount post 72 as shown in FIGS. 3 and 4. Each mount post 70, 72 extends radially outward from the runner 66. The second mount post 72 is spaced apart axially from the first mount post 70 to define a channel 71 therebetween. In other embodiments, the attachment 68 may be provided by L-shaped hangers, fir-tree shaped members, dovetail members, box shape panels, or other suitable features.

In the illustrative embodiment, the intermediate carrier body 30 is located in the channel 71 axially between the first mount post 70 and the second mount post 72 as shown in FIG. 3. Each of the pins 32, 34 extends axially through the first mount post 70, the intermediate carrier body 30, and the second mount post 72. The locating pads 59, 60 of the carrier 24 engage at least one of the radially-outwardly facing surface 74 of the first mount post 70 and the second mount post 72.

In the illustrative embodiment, each of the first mount post 70 and the second mount post 72 are also shaped to include pin holes 67, 69 as shown in FIG. 4. The first pin hole 67 extends axially through the first mount post 70 and is axially aligned with the first pin hole 67 that extends axially through the second mount post 72. The second pin holes 69 is spaced apart circumferentially from the first pin hole 67. The second pin hole 69 extends axially through the first mount post 70 and is axially aligned with the second pin hole 69 that extends axially through the second mount post 72.

In the illustrative embodiments, the intermediate carrier body 30 is shaped to include corresponding pin holes 81, 83 on circumferential ends 80, 82 of the intermediate carrier body 30 as shown in FIG. 4. The first pin hole 81 extends axially through the intermediate carrier body 30 on a first circumferential end 80 of the intermediate carrier body 30. The second pin hole 83 extends axially through the intermediate carrier body 30 on a second circumferential end 82 of the intermediate carrier body 30 opposite the first circumferential end 80.

The first pin 32 extends axially through the first pin hole 67 formed in the first mount post 70, the first pin hole 81 of the intermediate carrier body 30, and the first pin hole 67 formed in the second mount post 72 to couple the blade track segment 26 to the intermediate carrier body 30. In the illustrative embodiment, the second pin 34 extends axially through the second pin hole 69 formed in the first mount post 70, the second pin hole 83 of the intermediate carrier body 30, and the second pin hole 69 formed in the second mount post 72 to couple the blade track segment 26 to the intermediate carrier body 30.

Each of the retainers 36 each include a coupling 84 and a fastener 86 as shown in FIGS. 3 and 4. The coupling 84 is integrally formed with the intermediate carrier body 30 and extends radially outward from the intermediate carrier body 30. The fastener 86 extends radially inward through the corresponding hole 53 formed in the outer wall 52 into the corresponding coupling 84. The fasteners 86 have threads 89 that mate with corresponding threads formed in the coupling 84 to couple the intermediate carrier 28 with the assembled blade track segment 26 to the carrier 24. The fasteners 86 may be tightened to bring the radially-outwardly facing surface 74 of the mount posts 70, 72 into contact with the locating pads 59, 60 of the carrier 24.

In the illustrative embodiment, the intermediate carrier body 30 includes at least three retainers 36 as shown in FIG. 4. One retainer 36 extends radially outward from the intermediate carrier body 30 at a center 78 of the intermediate carrier body 30. The other two retainers 36 are located at opposite circumferential ends 80, 82 of the intermediate carrier body 30.

The axial orientation tabs 61, 62 formed in the outer wall 52 of the carrier 24 are configured to engage the intermediate carrier 28 on opposite axial sides 85, 87 as shown in FIGS. 3 and 4. The axial orientation tabs 61, 62 are configured to axially align intermediate carrier 28 relative to the carrier 24 so that the intermediate carrier 28 is in a predetermined axial position relative to the carrier 24.

In some embodiments, the orientation tabs 61, 62 may also include circumferential orientation tabs formed in the outer wall 52 of the carrier 24. The circumferential orientation tabs may be configured to engage the coupling 84 of the corresponding retainer 36 at the opposite circumferential ends 80, 82 of the intermediate carrier body 30. The circumferential orientation tabs 62 may be configured to circumferentially orientate the intermediate carrier body 30 relative to the carrier 24.

A method of assembling the turbine shroud segment 22 includes several steps. The method begins by arranging the intermediate carrier body 30 axially between the first mount post 70 and the second mount post 72. The intermediate carrier body 30 is arranged in the channel 71 such that the pin holes 81, 83 formed in the intermediate carrier body 30 align circumferentially with the pin holes 67, 69 in both the first mount post 70 and the second mount post 72.

After arranging the intermediate carrier body 30 between the mount posts, 70, 72, one of the pins 32 is inserted through the corresponding pin hole 67 formed in the first mount post 70, the corresponding pin hole 81 formed in the intermediate carrier body 30, and the corresponding pin hole 67 formed in the second mount post 72 to couple the blade track segment 26 to the intermediate carrier body 30. This step is repeated for the other pin 34 such that the pin 34 extends through the corresponding pin hole 69 formed in the first mount post 70, the corresponding pin hole 83 formed in the intermediate carrier body 30, and the corresponding pin hole 69 formed in the second mount post 72.

In some embodiments, after the pins 32, 34 are inserted into the blade track segment 26 and intermediate carrier body 30 to couple the components 26, 30 together, the bias member 65 is arranged on one end of the pin 32, 34. The bias member 65 may be arranged on the first end 44 of the pin 32, 34, before the assembled components 26, 30 are arranged in the attachment-receiving space 55 of the carrier 24.

With the intermediate carrier body 30 assembled with the blade track segment 26, the assembled components are arranged in the attachment-receiving space 55 formed in the carrier 24. The assembled blade track segment 26 and intermediate carrier 28 are arranged such that the holes 53 in the carrier 24 align with the couplings 84 and the feed passageways 42 formed in the carrier 24 aligns with the corresponding cooling passageways 32, 34 formed in the pins 32, 34.

In some embodiments, before the assembled blade track segment 26 and intermediate carrier body 30 are arranged in the attachment-receiving space 55, the method includes arranging the seals 90 in channels formed in the fore and aft radial walls 56, 58 of the carrier 24. As the assembled blade track segment 26 and intermediate carrier body 30 are arranged in the attachment-receiving space 55, the seals 90 engage the runner 66 of the blade track segment 26 to seal the attachment-receiving space 55.

Once the couplings 84 are aligned with the corresponding holes 53 formed in the carrier 24, the retainer 36 of the intermediate carrier 28 is coupled with the carrier 24. The retainer 36 is coupled with the carrier 24 by inserting the fasteners 86 through the holes 53 in the carrier 24 and into the respective coupling 84. The fasteners 86 are then tightened to bring the radially-outwardly facing surface 74 of both mount posts 70, 72 into contact with the locating pads 59, 60. In the illustrative embodiment, the orientation features 61, 62 help guide the intermediate carrier body 30 to the correct position so that the locating pads 59, 60 contact the surface 74 of the blade track segment 26 in the correct position.

These steps may be repeated for several turbine shroud segments 22 to form the turbine shroud 20. Once the turbine shroud segments 22 are assembled, the turbine shroud segments 22 may be arranged in the engine 10.

After the turbine shroud segments 22 are arranged in the engine 10, the method includes directing the flow of cooling air from the feed passageway 42 in the carrier 24, through the cooling passageway 38, 40 in the pin 32, 34, and into the attachment space 55 formed in the carrier 24. The flow of cooling air cools the pins 32, 34 of the intermediate carrier 28.

Figure 5:
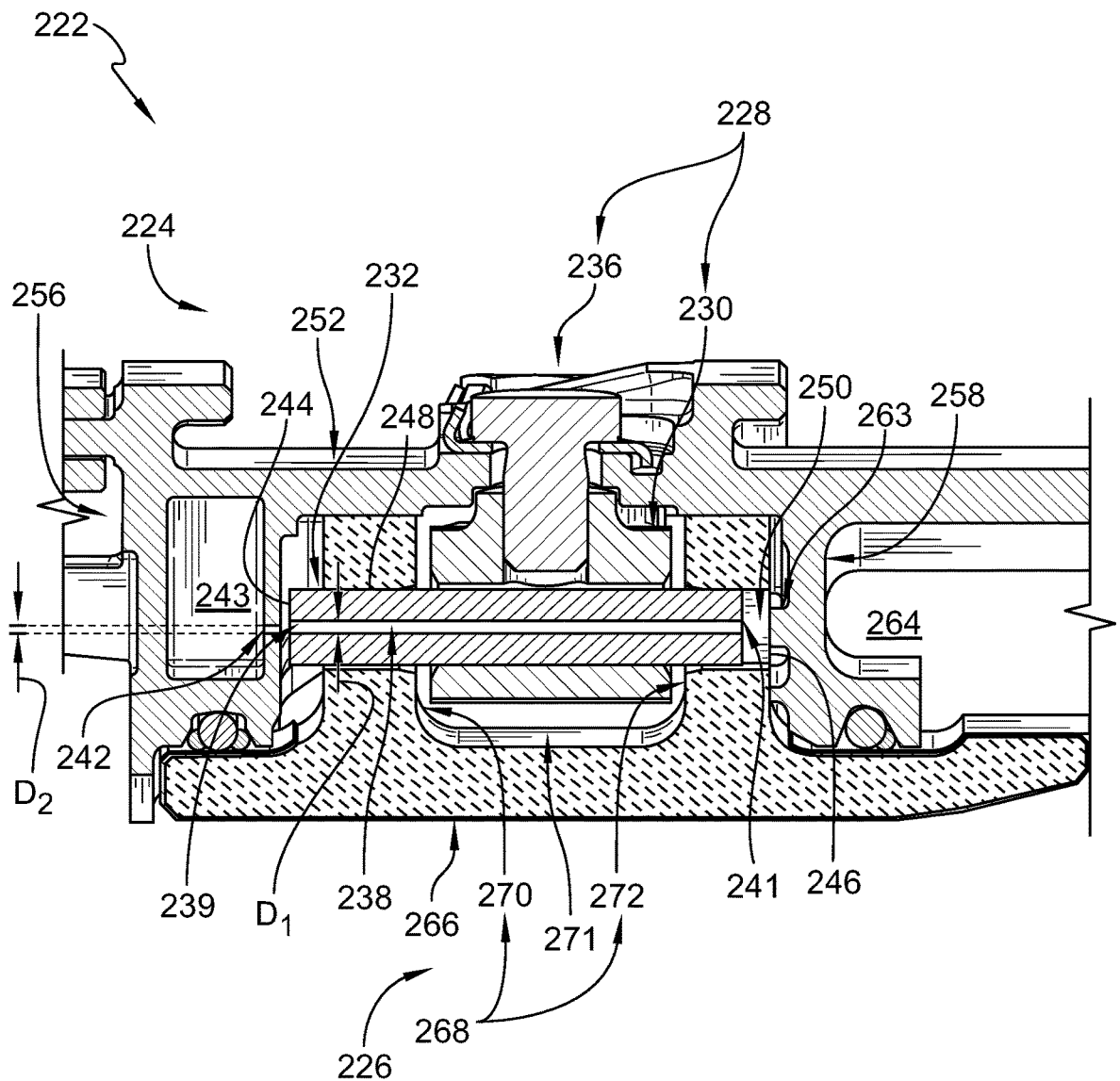
FIG. 5 is a cross-sectional view of another embodiment of a turbine shroud assembly adapted for use in the gas turbine engine of FIG. 1 showing the turbine shroud assembly includes a carrier, a blade track segment, and an intermediate carrier including an intermediate carrier body and a pin that extends axially through the blade track segment to couple the intermediate carrier to the blade track segment, and further showing the pin is formed to include a cooling passageway that extends axially through the pin and a recess that extends axially into one end of the pin to space an outlet of the cooling passageway from the carrier.
Figure 6:
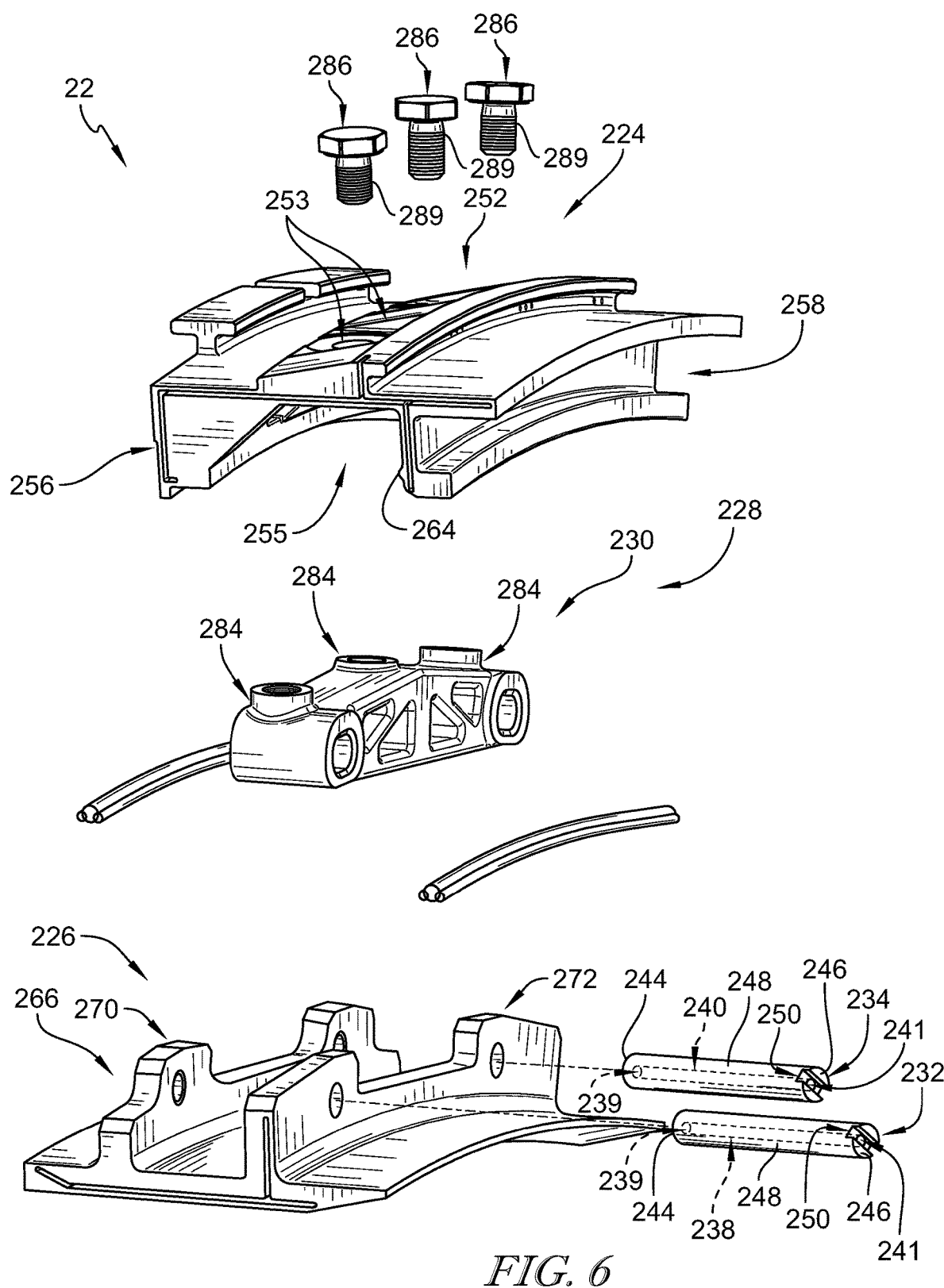
FIG. 6 is an exploded view of the turbine shroud assembly of FIG. 5 showing, from top to bottom, the carrier, the intermediate carrier, and the blade track segment.

Another embodiment of a turbine shroud segment 222 in accordance with the present disclosure is shown in FIGS. 5 and 6. The turbine shroud segment 222 is substantially similar to the turbine shroud segment 22 shown in FIGS. 1-4 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 222.

The turbine shroud segment 222 includes a carrier 224, a blade track segment 226, and an intermediate carrier 228 as shown in FIGS. 5 and 6. The intermediate carrier 228 is configured to couple the blade track segment 226 to the carrier 224.

The intermediate carrier 228 includes an intermediate carrier body 230, two pins 232, 234, and retainers 236 as shown in FIGS. 5 and 6. The intermediate carrier body 230 is arranged axially between a fore mount post 270 and an aft mount post 272 of the blade track segment 226. The pins 232, 234 extend axially through the fore and aft mount posts 270, 272 of the blade track segment 226 and the intermediate carrier body 230 to couple the blade track segment 226 to the intermediate carrier body 230. The retainers 236 extends outward from the intermediate carrier body 230 to the carrier 224 and engages the carrier 224 to couple the intermediate carrier 228 to the carrier 224.

Each of the pins 232, 234 are formed to include a cooling passageway 238, 240 as shown in FIGS. 5 and 6. The cooling passageway 238, 240 extends axially through the pin 232, 234 and aligns with a corresponding feed passageway 242 formed in the carrier 224. The cooling passageway 238, 240 aligns with the feed passageway 242 such that cooling air is conducted from the feed passageway 242 through the pin 232, 234. The cooling air provided by the feed passageway 242 through the cooling passageway 238, 240 of the respective pin 232, 234 helps to cool the pin 232, 234 of the intermediate carrier 228.

Each of the pins 232, 234 further includes a first end 244, a second end 246, and a body 248 as shown in FIGS. 5 and 6. The first end 244 is arranged adjacent to an outlet of the feed passageway 242. The second end 246 is spaced apart axially from the first end 244. The body 248 extends between and interconnects the first end 244 and the second end 246. The cooling passageway 238, 240 extends axially through the entire axial length of the pin 238, 240.

In the illustrative embodiment, the second end 246 of each pin 232, 234 is formed to include a recess 250 as shown in FIGS. 5 and 6. The recess 250 extends axially into the second end 246 of the pin 232, 234. The recess 250 is configured to space an outlet 241 of the cooling passageway 238, 240 from the carrier 224. In this way, the outlet 241 of the cooling passageway 238, 240 is not closed off by the carrier 224 allowing the flow of cooling air through the cooling passageway 238, 240 into an attachment-receiving space 255 of the carrier 224.

In the illustrative embodiment, the recess 250 is rectangular in shape as shown in FIGS. 5 and 6. In other embodiments, the recess 250 may be another suitable shape.

In the illustrative embodiment, the cooling passageway 238, 240 also has an inlet 239 aligned with the feed passageway 242 as shown in FIG. 5. The outlet 241 of the cooling passageway 238, 240 is spaced apart axially from the inlet 239 and opens into the recess 250.

The cooling passageway 238, 240 has a diameter $D_1$ that is constant from the inlet 239 to the outlet 241 in the illustrative embodiment. The diameter $D_1$ of the cooling passageway 238, 240 is greater than a diameter $D_2$ of the feed passageway 242.

The small diameter $D_2$ of the feed passageway 242 may discharge the flow of cooling air as a jet stream as it exits the feed passageway 242. As such, the flow of cooling air may dissipate as the flow moves toward the cooling passageway 238, 240 forming a cone shape, which may cause leaks as the flow flows from the feed passageway 242 to the cooling passageway 238, 240.

To minimize the leakage, the inlet 239 of the cooling passage 238 is spaced apart from the outlet of the feed passageway 242 such that there is a gap 245 therebetweeen. Additionally, the larger diameter $D_1$ of the cooling passageway 238, 240 captures the dissipating flow of cooling air discharged by the feed passageway 242, which further helps to minimize leakage.

Each carrier segment 224 illustratively includes an outer wall 252, a fore radial wall 256, and an aft radial wall 258 as shown in FIGS. 5 and 6. The outer wall 252 extends circumferentially partway about the axis 11. Each of the fore and aft radial walls 256, 258 extend radially inward from the outer wall 252 on opposite axial ends of the outer wall 252. The aft radial wall 258 is spaced apart axially from the fore radial wall 256 to define the attachment-receiving space 255 therebetween that receives the fore and aft mount posts 270, 272 of the blade track segment 226.

The fore radial wall 256 is shaped to define the feed passageway 242 and a feed cavity 243 as shown in FIG. 5. The feed cavity 243 is formed in the fore radial wall 256 and is configured to receive cooling air from the cooling air source 21. The feed passageways 242 are in fluid communication with the feed cavity 243 to receive cooling air and deliver the cooling air to the cooling passageway 238, 240.

The aft radial wall 258 is shaped to include axial pin locators 263 and a chordal seal 264 as shown in FIGS. 5 and 6. The axial pin locators 263 extend axially forward from the aft radial wall 258 to block axial movement of the corresponding pin 232, 234 relative to the blade track segment 226. The chordal seal 264 extends axially forward from the aft radial wall 258 and engages the attachment portion 268 of the blade track segment 226 to axially locate the blade track segment 226 relative to the carrier 224. In the illustrative embodiment, the chordal seal 264 is spaced radially inward from the axial pin locators 263.

In the illustrative embodiment, the axial pin locator 263 engages the second end 246 of the corresponding pin 232, 234 at a center of the pin 232, 234. The recess 250 spaces the outlet 241 from the axial pin locator 263 such that the flow of cooling air exits the outlet 241 of the cooling passageway 238, 240 through the recess 250 and into the attachment-receiving space 255. In this way, the axial pin locator 263 blocks axial movement of the pin 232, 234 without blocking the flow of cooling air out of the outlet 241.

Figure 7:
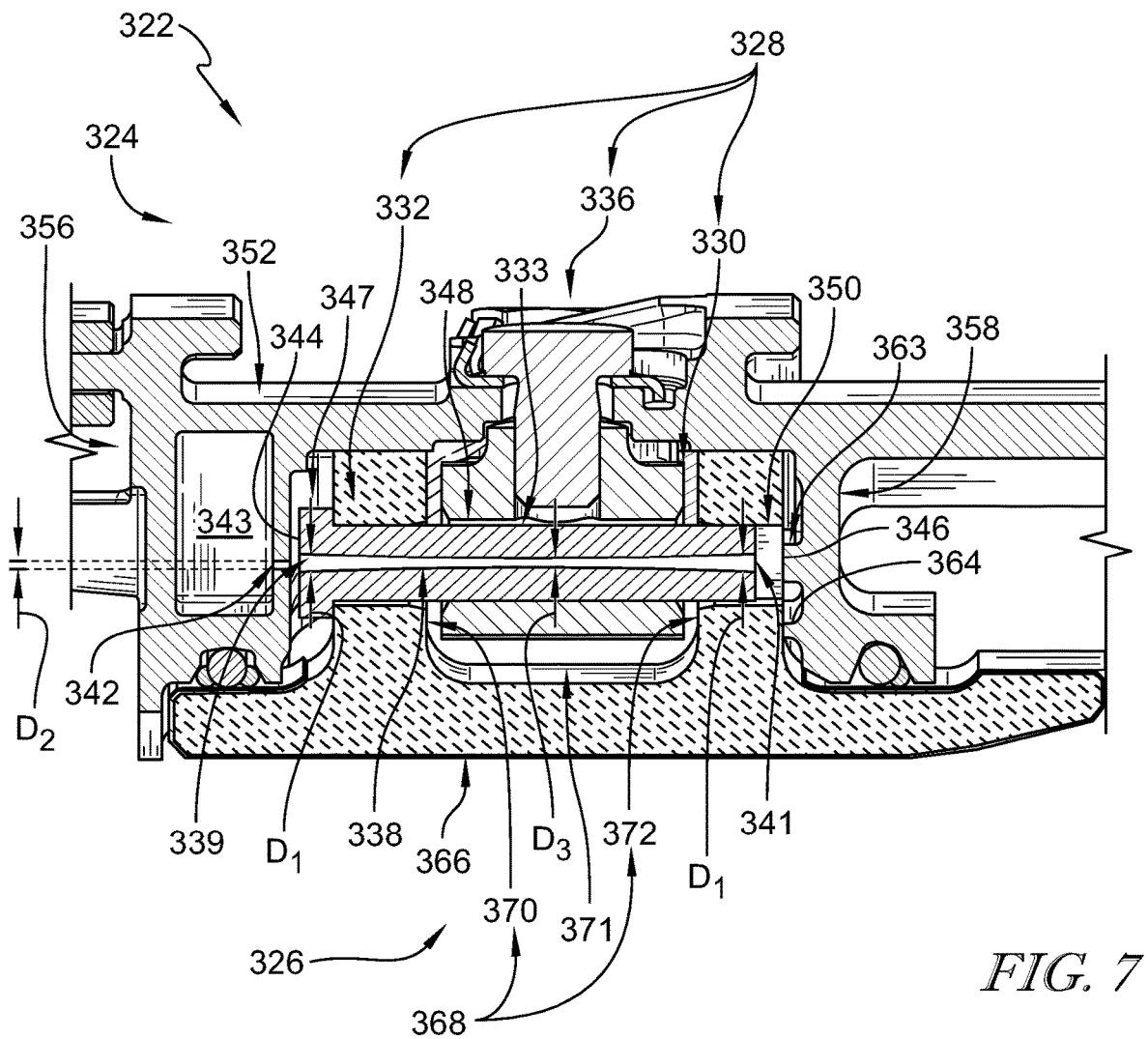
FIG. 7 is a cross-sectional view of another embodiment of a turbine shroud assembly adapted for use in the gas turbine engine of FIG. 1 showing the turbine shroud segment includes a carrier, a blade track segment, and an intermediate carrier including an intermediate carrier body and a pin that extends axially through the blade track segment to couple the intermediate carrier to the blade track segment, and further showing the pin is formed to include a head, a body that extends axially from the head, and a cooling passageway that extends axially through the head and body of the pin.
Figure 8:
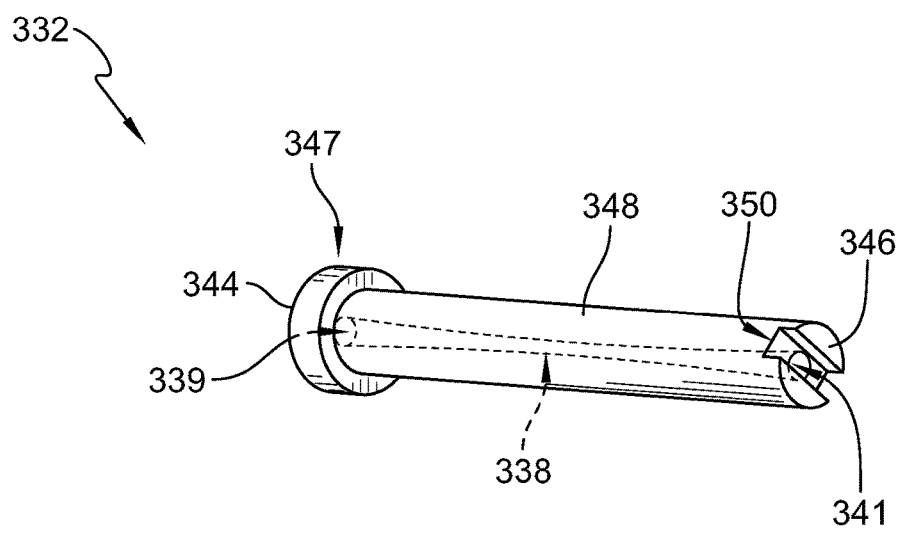
FIG. 8 is a perspective view of the pin included in the intermediate carrier of FIG. 7 showing a diameter of the cooling passageway varies along the axial length of the pin.

Another embodiment of a turbine shroud segment 322 in accordance with the present disclosure is shown in FIGS. 7 and 8. The turbine shroud segment 322 is substantially similar to the turbine shroud segment 22 shown in FIGS. 1-4 and described herein. Accordingly, similar reference numbers in the 300 series indicate features that are common between the turbine shroud segment 22 and the turbine shroud segment 322. The description of the turbine shroud segment 22 is incorporated by reference to apply to the turbine shroud segment 322, except in instances when it conflicts with the specific description and the drawings of the turbine shroud segment 322.

The turbine shroud segment 322 includes a carrier 324, a blade track segment 326, and an intermediate carrier 328 as shown in FIG. 7. The intermediate carrier 328 is configured to couple the blade track segment 326 to the carrier 324.

The intermediate carrier 328 includes an intermediate carrier body 330, a pin 332, and retainers 336 as shown in FIGS. 7 and 8. The intermediate carrier body 330 is arranged axially between a fore mount post 370 and an aft mount post 372 of the blade track segment 326. The pin 332 extends axially through the fore and aft mount posts 370, 372 of the blade track segment 326 and the intermediate carrier body 330 to couple the blade track segment 326 to the intermediate carrier body 330. The retainers 336 extends outward from the intermediate carrier body 330 to the carrier 324 and engages the carrier 324 to couple the intermediate carrier 328 to the carrier 324.

The pin 332 is formed to include a cooling passageway 338 as shown in FIGS. 7 and 8. The cooling passageway 338 extends axially through the pin 332 and aligns with a corresponding feed passageway 342 formed in the carrier 324. The cooling passageway 338 aligns with the feed passageway 342 such that cooling air is conducted from the feed passageway 342 through the pin 332. The cooling air provided by the feed passageway 342 through the cooling passageway 338 of the respective pin 332 helps to cool the pin 332 of the intermediate carrier 328.

The pin 332 includes a pin head 347 and a body 348 as shown in FIGS. 7 and 8. The pin head 347 forms a first end 344 of the pin 332 that is arranged adjacent to an outlet of the feed passageway 342. The body 348 extends axially aft from the pin head 347 to a second end 346. The cooling passageway 338, 340 extends axially through the pin head 347 and the body 348 for the entire axial length of the pin 338, 340.

The pin head 347 has a larger cross-section area than the body 348 of the pin 332. In the illustrative embodiment, the cross-section area of the pin head 347 is greater than the pin hole formed in the fore mount post 370 of the blade track segment 326. In this way, the pin 332 only fits through the attachment portion 368 and the intermediate carrier body 330 in one direction simplifying assembly.

In the illustrative embodiment, the cooling passageway 338, 340 also has an inlet 339 and an outlet 341 as shown in FIGS. 7 and 8. The inlet 339 is aligned with the feed passageway 342, while the outlet 341 of the cooling passageway 338, 340 is spaced apart axially from the inlet 339.

The cooling passageway 338 has a diameter $D_1$, $D_3$ that varies from the inlet 339 to the outlet 341 in the illustrative embodiment. The diameter $D_1$, $D_3$ has a maximum value $D_1$ at the first end 344 and the second end 346 of the pin and a minimum value $D_3$ proximate an axial center 333 of the pin 332.

The maximum diameter $D_1$ and the minimum diameter $D_3$ of the cooling passageway 338 is configured to provide a venturi tube as shown in FIGS. 7 and 8. The minimum diameter $D_3$ of the cooling passageway 338 causes the flow rate of the cooling air moving through the cooling passageway 338 to increase at the constricted section. As such, the flow of cooling air is drawn through the cooling passageway 338, ensuring the flow of cooling air flows in the correct direction and is discharged at the outlet 341 of the cooling passageway 338.

In the illustrative embodiment, the minimum diameter $D_3$ of the cooling passageway 338 is located at the axial center 333 of the pin 332. In some embodiments, the minimum diameter $D_3$ of the cooling passageway 338 may be located axially forward of the axial center 333 of the pin 332 and closer to the inlet 339 of the cooling passageway 338. In other embodiments, the minimum diameter $D_3$ of the cooling passageway 338 may be located axially aft of the axial center 333 of the pin 332 and closer to the outlet 341. The position of the constricted section created by the minimum diameter $D_3$ of the cooling passageway 338 may optimized to achieve the desired flow of the cooling air through the cooling passageway 338.

In the illustrative embodiment, the maximum diameter $D_1$ of the cooling passageway 338 is greater than a diameter $D_2$ of the feed passageway 342. Similar to the embodiments of FIGS. 5 and 6, the maximum diameter $D_1$ of the cooling passageway 338 is greater than a diameter $D_2$ of the feed passageway 342 so as to minimize leaks between the passageways 338, 342 ad cooling air flows from the feed passageway 342 to the cooling passageway 338.

In the illustrative embodiment, the diameter $D_1$ and the diameter $D_3$ of the cooling passageway 338 are the same size. In other embodiments, the diameter $D_1$ and the diameter $D_3$ of the cooling passageway 338 may be different in size.

In the illustrative embodiment, the second end 346 of each pin 332, 334 is formed to include a recess 350 as shown in FIGS. 7 and 8. The recess 350 extends axially into the second end 346 of the pin 332, 334. The recess 350 is configured to space the outlet 341 of the cooling passageway 338, 340 from the carrier 324. In this way, the outlet 341 of the cooling passageway 338, 340 is not closed off by the carrier 324 allowing the flow of cooling air through the cooling passageway 338, 340 into the attachment-receiving space 355.

Each carrier segment 324 illustratively includes an outer wall 352, a fore radial wall 156, and an aft radial wall 358 as shown in FIG. 7. The outer wall 352 extends circumferentially partway about the axis 11. Each of the fore and aft radial walls 356, 358 extend radially inward from the outer wall 352 on opposite axial ends of the outer wall 352. The aft radial wall 358 is spaced apart axially from the fore radial wall 356 to define the attachment-receiving space 355 therebetween that receives the fore and aft mount posts 370, 372 of the blade track segment 326.

The fore radial wall 356 is shaped to the feed passageway 342 and a feed cavity 343 as shown in FIG. 7. The feed cavity 343 is formed in the fore radial wall 356 and is configured to receive cooling air from the cooling air source 21. The feed passageways 342 are in fluid communication with the feed cavity 343 to receive cooling air and deliver the cooling air to the cooling passageway 338.

The aft radial wall 358 is shaped to include axial pin locators 363 and a chordal seal 364 as shown in FIG. 7. The axial pin locators 363 extend axially forward from the aft radial wall 358 to block axial movement of the corresponding pin 332, 334 relative to the blade track segment 326. The chordal seal 364 extends axially forward from the aft radial wall 358 and engages the attachment portion 368 of the blade track segment 326 to axially locate the blade track segment 326 relative to the carrier 324. In the illustrative embodiment, the chordal seal 364 is spaced radially inward from the axial pin locators 363.

The present disclosure relates ceramic matrix composite blade track segments 26, 226, 326 with an inverted Pi shape. In this arrangement, the blade track segment 26, 226, 326 may be supported by two pins 32, 34, 232, 234, 332 and an intermediate carrier body 30, 230, 330. The intermediate carrier body 30, 230, 330 may be attached to the main carrier 24, 224, 324 via three retainers 38, 238, 338.

The temperature on the two pins 32, 34, 232, 234, 332 may exceed the material allowable at maximum takeoff conditions. To cool intermediate carrier 28, 228, 328, HP6 cooling air may be directed through the cooling passageways 38, 40, 238, 240, 338 formed in the pins 32, 34, 232, 234, 332.

In the illustrative embodiments, the fore radial wall 356 is formed to include feed passageways 42, 242, 342 that align with the cooling passageways 38, 40, 238, 240, 338 of the pins 32, 34, 232, 234, 332.

The hole sizes and locations may be optimized to minimize leakage and stress and to ensure the pin 32, 34, 232, 234, 332 receives the necessary amount of cooling air. Cooling air flows from forward of the carrier 24, 224, 324 to the aft end 46, 246, 346 of the pin 32, 34, 232, 234, 332 and exit into the attachment-receiving space 55, 255, 355.

Other embodiments are shown in FIGS. 5-8. In these embodiments, the pins 232, 234, 332 each include a castellation or recess feature 250, 350 at the exit end 246, 346 of the pin 232, 234, 332 to ensure the outlet 241, 341 is not closed off by the aft radial wall 258, 358 of the carrier 224, 324.

The size of the recess 250, 350 is optimized to ensure the flow of cooling air through the pin 232, 234, 332. In some embodiments, the recess 250, 350 may be poka-yoked by adding the features to both sides, ensuring functionality if the pin 232, 234, 332 is installed in any orientation. The shape of the recess 250, 350 may be done with alternative shapes.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use in a gas turbine engine, the turbine shroud assembly comprising
a carrier comprising metallic materials and arranged to extend circumferentially at least partway about an axis, the carrier formed to include a feed passageway configured to conduct cooling air through a portion of the carrier,
a blade track segment comprising ceramic matrix composite materials, the blade track segment formed to include a runner shaped to extend circumferentially partway around the axis, a first mount post that extends radially outward from the runner, and a second mount post that extends radially outward from the runner, the second mount post spaced apart axially from the first mount post to define a channel therebetween, and
an intermediate carrier configured to couple the blade track segment to the carrier, the intermediate carrier including an intermediate carrier body arranged axially between the first mount post and the second mount post, at least one pin that extends axially into the first mount post, the intermediate carrier body, and the second mount post to couple the intermediate carrier body to the blade track segment, and at least one retainer that extends radially outward from the intermediate carrier body through the carrier to couple the intermediate carrier and the blade track segment with the carrier,
wherein the at least one pin is formed to include a cooling passageway that extends axially through the at least one pin and aligns with the feed passageway of the carrier such that cooling air is configured to be conducted from the feed passageway through the at least one pin to cool the at least one pin.

2. The turbine shroud assembly of claim 1, wherein the carrier includes an outer wall that extends circumferentially at least partway about the axis, a first radial wall that extends radially inward from the outer wall, and a second radial wall that extends radially inward from the outer wall, the second radial wall is spaced apart from the first radial wall to define an attachment-receiving space therebetween, and the feed passageway extends axially through the first radial wall of the carrier.

3. The turbine shroud assembly of claim 2, wherein the first radial wall is formed to include a feed cavity configured to receive cooling air from a cooling air source and the feed passageway are in fluid communication with the feed cavity.

4. The turbine shroud assembly of claim 2, wherein the at least one pin includes a first end located adjacent to the first radial wall, a second end spaced apart axially from the first end of the pin and located adjacent to the second radial wall, and a body that extends between and interconnects the first end and the second end, the second end shaped to include a recess that extends axially into the second end of the pin so that an outlet of cooling passageway is spaced apart axially from the second radial wall.

5. The turbine shroud assembly of claim 1, wherein the at least one pin includes a first end located adjacent an outlet of the feed passageway in the carrier, a second end spaced apart axially from the first end of the pin, and a body that extends between and interconnects the first end and the second end, the second end shaped to include a recess that extends axially into the second end of the pin.

6. The turbine shroud assembly of claim 5, wherein the feed passageway has a first diameter and the cooling passageway has a second diameter that is greater than the first diameter of the feed passageway.

7. The turbine shroud assembly of claim 6, wherein the second diameter of the cooling passageway varies along an axial length of the at least one pin.

8. The turbine shroud assembly of claim 7, wherein the second diameter of the cooling passageway has a maximum value at the first end of the at least one pin and the second end of the at least one pin and a minimum value proximate an axial center of the at least one pin.

9. The turbine shroud assembly of claim 5, wherein the first end of the pin forms a pin head located adjacent an outlet of the feed passageway and a body that extends axially from the pin and has a first diameter that is less than a second diameter of the pin head.

10. The turbine shroud of claim 1, wherein the feed passageway has a first diameter and the cooling passageway has a second diameter that is greater than the first diameter of the feed passageway.

11. The turbine shroud of claim 10, wherein the second diameter of the cooling passageway varies along an axial length of the at least one pin.

12. A turbine shroud assembly adapted for use in a gas turbine engine, the turbine shroud assembly comprising
a carrier that extends at least partway circumferentially around an axis, the carrier formed to include a feed passageway configured to conduct cooling air through a portion of the carrier,
a blade track segment including a runner shaped to extend partway around the axis and an attachment portion that extends radially outward from the runner, and
an intermediate carrier including an intermediate carrier body, a pin that extends axially into the attachment portion and the intermediate carrier body to couple the intermediate carrier body to the blade track segment, and a first retainer that extends through the carrier to couple the intermediate carrier and the blade track segment to the carrier,
wherein the pin is formed to include a cooling passageway that extends axially through the pin and aligns with the feed passageway of the carrier such that cooling air is configured to be conducted from the feed passageway through the pin to cool the pin.

13. The turbine shroud assembly of claim 12, wherein the carrier includes an outer wall that extends circumferentially at least partway about the axis, a first radial wall that extends radially inward from the outer wall, and a second radial wall that extends radially inward from the outer wall, the second radial wall is spaced apart from the first radial wall to define an attachment-receiving space therebetween, and the feed passageway extends axially through the first radial wall of the carrier.

14. The turbine shroud assembly of claim 13, wherein the pin includes a first end located adjacent to the first radial wall, a second end spaced apart axially from the first end of the pin and located adjacent to the second radial wall, and a body that extends between and interconnects the first end and the second end, the second end shaped to include a recess that extends axially into the second end of the pin so that an outlet of cooling passageway is spaced apart axially from the second radial wall.

15. The turbine shroud assembly of claim 12, wherein the pin includes a first end located adjacent an outlet of the feed passageway in the carrier, a second end spaced apart axially from the first end of the pin, and a body that extends between and interconnects the first end and the second end, the second end shaped to include a recess that extends axially into the second end of the pin.

16. The turbine shroud assembly of claim 12, wherein the feed passageway has a first diameter and the cooling passageway has a second diameter that is greater than the first diameter of the feed passageway.

17. The turbine shroud assembly of claim 16, wherein the second diameter of the cooling passageway varies along an axial length of the pin.

18. The turbine shroud assembly of claim 12, wherein the pin includes a pin head located adjacent an outlet of the feed passageway and a body that extends axially from the pin and has a first diameter that is less than a second diameter of the pin head.

19. A method comprising
providing a carrier, a blade track segment, and an intermediate carrier configured to couple the blade track segment to the carrier, the blade track segment including a runner shaped to extend partway around an axis, a first mount post that extends radially outward from the runner, and a second mount post spaced apart axially from the first mount post that extends radially outward from the runner, and the intermediate carrier including an intermediate carrier body, a pin, and a retainer, wherein the pin is formed to include a cooling passageway that extends axially through the pin,
arranging the intermediate carrier axially between the first mount post and the second mount post so that a pin hole formed in the intermediate carrier aligns circumferentially with a pin hole in the first mount post and a pin hole in the second mount post,
inserting the pin through the pin hole formed in the first mount post, the pin hole formed in the intermediate carrier, and the pin hole formed in the second mount post to couple the blade track segment to the intermediate carrier body,
arranging the intermediate carrier in an attachment space formed in the carrier so that a feed passageway formed in the carrier aligns with the cooling passageway formed in the pin,
coupling the retainer of the intermediate carrier with the carrier, and
directing a flow of cooling air from the feed passageway in the carrier, through the cooling passageway in the pin, and into the attachment space formed in the carrier to cool the pin.

20. The method of claim 19, wherein the feed passageway has a first diameter and the cooling passageway has a second diameter that is greater than the first diameter of the feed passageway.

* * * * *